(12) United States Patent
Babjak et al.

(10) Patent No.: US 6,652,603 B2
(45) Date of Patent: Nov. 25, 2003

(54) PROCESS FOR REMOVING SODIUM SULFATE FROM NICKEL HYDROXIDE EFFLUENT STREAMS

(75) Inventors: Juraj Babjak, Mississauga (CA); Feng Zou, Mississauga (CA)

(73) Assignee: Inco Limited, Toronto (CA)

( * ) Notice: Subject to any disclaimer, the term of this patent is extended or adjusted under 35 U.S.C. 154(b) by 357 days.

(21) Appl. No.: 09/896,806

(22) Filed: Jun. 29, 2001

(65) Prior Publication Data

US 2003/0044343 A1 Mar. 6, 2003

(51) Int. Cl.⁷ .................................................. B01D 9/00
(52) U.S. Cl. ...................... 23/302 T; 423/199; 423/551; 423/553
(58) Field of Search ........................ 23/302 T; 423/179, 423/184, 199, 551, 553

(56) References Cited

U.S. PATENT DOCUMENTS

| | | |
|---|---|---|
| 1,366,301 A | 1/1921 | Nicolaas |
| 2,739,044 A | 3/1956 | Ashley et al. ................. 23/302 |
| 4,246,241 A | 1/1981 | Mathur et al. ............... 423/179 |
| 5,037,463 A | 8/1991 | Engdahl et al. ................ 62/532 |
| 5,447,707 A | 9/1995 | Babjak et al. ............... 423/592 |
| 5,545,392 A | 8/1996 | Babjak et al. ............... 423/592 |
| 5,788,943 A | 8/1998 | Aladjov ....................... 423/594 |
| 5,824,283 A | 10/1998 | Babjak et al. ............... 423/592 |

FOREIGN PATENT DOCUMENTS

| | | |
|---|---|---|
| DE | 1123796 | 2/1962 |
| DE | 3129189 | 2/1983 |
| FR | 1015558 | 10/1952 |

OTHER PUBLICATIONS

*Mellor's Comprehensive Treatise on Inorganic and Theoretical Chemistry*, pp. 997–999, vol. II, Supplement II, Alkali Metals, John Wiley & Sons, N.Y., N.Y. 1961 No month.

F.D. Snell and C.T. Snell, *Chemicals of Commerce*, p. 34, D. Van Nostrand & Co., N.Y., N.Y., 1952 No month.

D. Butts, *Kirk–Othmer Encyclopedia of Chemical Technology*, pp. 403–411, vol. 22, 4$^{th}$ ed., John Wiley and Sons, N.Y., N.Y., 1997 No month.

*Primary Examiner*—Stanley S. Silverman
*Assistant Examiner*—Edward M. Johnson
(74) *Attorney, Agent, or Firm*—Edward A. Steen

(57) ABSTRACT

A method for removing sodium sulfate from nickel and ammonia containing aqueous effluents. The effluents, typically from a nickel hydroxide production process, are cooled to or below 30° C. to crystallize and precipitate the sodium sulfate and dewater the effluent. The sodium sulfate is retrieved and the remaining solution is recycled back to the nickel hydroxide production process.

10 Claims, 1 Drawing Sheet

PROCESS FOR REMOVING SODIUM SULFATE FROM NICKEL HYDROXIDE EFFLUENT STREAMS

TECHNICAL FIELD

This invention relates to the production of nickel hydroxide in general, and more particularly, to a process for removing the by-product sodium sulfate from the resulting effluent and recycling the sodium sulfate depleted solution back to the nickel hydroxide production process.

BACKGROUND ART

Nickel hydroxide ($Ni(OH)_2$—also known as nickelous hydroxide and divalent nickel hydroxide) is an essential compound in alkaline cells, metal hydride batteries and other industrial and commercial applications. Moreover, nickel hydroxide is a precursor of nickel oxide—a critical industrial chemical having a myriad of uses.

Most commercial processes for making nickel hydroxide rely on its caustic precipitation from nickel salt solutions (nickel sulfate, nickel chloride or nickel nitrate) containing ammonia/ammonium salts.

Assignee has developed alternative methods for directly producing nickel hydroxide by utilizing elemental nickel powders. See U.S. Pat. No. 5,447,707 to Babjak et al., U.S. Pat. No. 5,824,283 to Babjak et al. and U.S. Pat. No. 5,545,392 to Babjak et al. However, most commercial nickel hydroxide producers still employ variations of the traditional caustic precipitation technique.

Accordingly, precipitation of chemical compounds from sulfate solutions using a sodium base (sodium hydroxide or sodium carbonate) generate prodigious amounts of sodium sulfate as a by-product. In conventional nickel hydroxide production, the precipitation is usually carried out from an approximate a 2 M nickel sulfate solution, containing ammonia ($NH_3$), in a strong sodium hydroxide solution according to the overall reaction:

$NiSO_4(aq)+2NaOH(aq) \rightarrow Ni(OH)_2(solid)+Na_2SO_4(aq)$

One mole of sodium sulfate by-product is generated per each mole of nickel hydroxide product. Large quantities of effluent typically contain about one mole/liter of sodium sulfate, about 0.5 mole/liter of ammonia and small quantities of nickel and possibly other elements. Discharge of this effluent is environmentally unacceptable.

Many regional U.S. and Canadian environmental regulations call for the following limits:

≦100 mg/L of Kjeldahl nitrogen (corresponding to ≦121 mg/L of ammonia provided no other nitrogen compounds are present in the effluent)

≦3 mg/L of nickel

≦1500 mg/L of sulfate 5.5≧pH≧9.5

≦65° C. effluent temperature

The presence of free ammonia causes the nickel to complex with it thereby hampering the precipitation process. Nickel amines, for example $NiNH_3^{++}$, formed by difficult-to-break covalent bounds between the nickel and the hydrogen, create impediments to precipitation. The nickel tends to stay in solution. Diluting the effluent with water, in order to achieve the allowable limits, is against U.S. Environmental Protection Agency and other regulations. Although the sulfate specification might be less severe in some jurisdictions, the removal of ammonia to the allowable level is always necessary. This requires subjecting the entire effluent stream to an ammonia distillation step using a tall distillation column which is a rather costly operation. Moreover, the concentration of nickel must be reduced to the desired level and the pH of the solution must be adjusted before the effluent can be safely discharged. The added burden is time consuming, equipment intensive and costly.

SUMMARY OF THE INVENTION

A process for removing sodium sulfate from effluents by crystallization at relatively low temperatures. The sodium sulfate crystallizes as pure $Na_2SO_4.10H_2O$ compound (known as Glauber's salt, mirabilite and sodium sulfate decahydrate). The mother liquor containing the ammonia and nickel ions may be recycled back to the original process.

PREFERRED EMBODIMENT OF THE INVENTION

Figure 1:
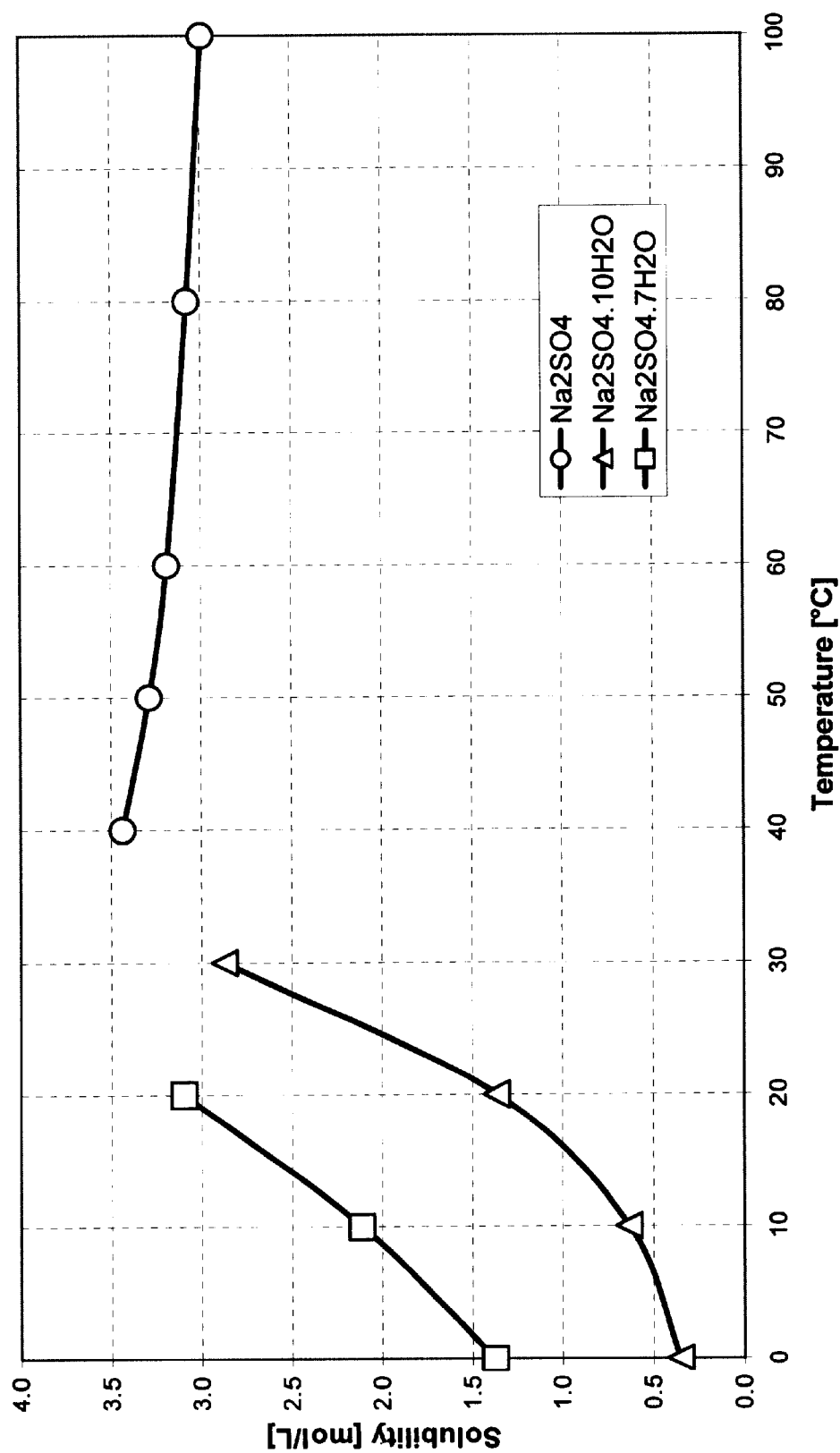
FIG. 1 is a solubility graph of $Na_2SO_4$.

Instead of treating the effluent by removing ammonia and nickel prior to its disposal, as is commonly done, the present delightfully simple and exquisite invention turns the entire paradigm on its head and provides for a more effective and economical treatment by removing the sodium sulfate and returning the sodium sulfate depleted ammonia and nickel solution back to the initial process.

The terms "effluent" and "solution" may be interchanged although they essentially lie at the opposite ends of the processing continuum.

Sodium sulfate decahydrate ($Na_2SO_4.10H_2O$)—the most commonly occurring sodium sulfate in nickel hydroxide production—is removed by crystallizing it and precipitating it out of the solution. FIG. 1 shows the solubility of various forms of sodium sulfate against temperatures expressed in terms of anhydrous substance. By cooling the effluent solution to a relatively low temperature, the crystallization step removes not only the desired quantity of sodium sulfate but also a substantial portion of water from the effluent. The added benefit of water removal is beneficial to maintain the water balance when the solution (now reduced in sodium sulfate) is recycled back to the main nickel hydroxide production process.

EXAMPLE

Crystallization tests were carried out in a laboratory batch crystallizer, equipped with a mixer and a temperature controller. Simulated process liquors having three different compositions were subjected to crystallization at a temperature of 5° C. The analyses of feed process liquors, mother liquors and crystals are shown in the Table below:

| Process Liquor | | | Mother Liquor | | | $Na_2SO_4 \cdot 10H_2O$ |
| --- | --- | --- | --- | --- | --- | --- |
| $Na_2SO_4$ [mol/L] | $Ni^{++}$ [g/L] | $NH_3$ [g/L] | $Na_2SO_4$ [mol/L] | $Ni^{++}$ [g/L] | $NH_3$ [g/L] | Ni [wt %] |
| 0.85 | 0.053 | 8.33 | 0.38 | 0.061 | 9.08 | 0.010 |
| 1.085 | 0.053 | 8.33 | 0.37 | 0.078 | 10.2 | 0.004 |
| 2.85 | 0.053 | 8.33 | 0.29 | 0.100 | 14.0 | 0.007 |

It can be seen that the concentration of sodium sulfate in all three tests was reduced substantially to 0.3–0.4 mole/L.

In addition, since each mole of crystallized sodium sulfate removes 10 moles of water, the volume of solution (volume of process liquor—volume of mother liquor) was substantially reduced. As a consequence the concentrations of ammonia and nickel in the solution increased correspondingly.

The concentration of nickel in the crystals was very low. Since the crystals were separated from the mother liquor by filtration and no crystal washing was applied, the minor nickel contamination was presumably due to adherence of the mother liquor on the crystals' surface. Centrifuging and slight water spraying of the crystals should eliminate nickel contamination of the crystals completely. Hence the described technique produces a pure sodium sulfate suitable for sales. The mother liquor containing all the ammonia and nickel, originally present in the effluent and now substantially depleted of sodium sulfate, can be recycled back to the main production process.

Standard cooling systems known to those in the art for decreasing the temperature of the effluent/solution may be used. As shown in FIG. 1, as the temperature of the solution is diminished, the solubility of $Na_2SO_4 \cdot 10H_2O$ decreases causing the crystallization and precipitation thereof. Although 5° C. was utilized in the above tests, a reasonable temperature spread of about 0° C. to about 30° C. may be utilized keeping in mind, of course, that solubility decreases with temperature. It should be also noted that $Na_2SO_4 \cdot 7H_2O$ (typically present in much smaller quantities) will also favorably precipitate out of solution but at somewhat lower temperatures.

Although solution temperatures may be reduced below 0° C., say in cold climates, it is unnecessary to affirmatively go that low since most of the sodium sulfate is removed in the region at or above about 0° C. Moreover, the incremental improvement in crystallization does not justify the additional expenses associated with cooling the solution substantially below 0° C.

The pure crystals of sodium sulfate may be used in the detergent and paper industries, among others.

While in accordance with the provisions of the statute, there are illustrated and described herein specific embodiments of the invention, those skilled in the art will understand that changes may be made in the form of the invention covered by the claims and that certain features of the invention may sometimes be used to advantage without a corresponding use of the other features The embodiments of the invention in which an exclusive property or privilege is claimed are defined as follows:

1. A process for recovering sodium sulfate from an aqueous solution including entrained nickel and ammonia, the process comprising:

a) cooling the solution to a temperature equal to or below about 30° C.;

b) crystallizing at least a portion of the sodium sulfate present in the solution; and c) removing the crystallized sodium sulfate from the solution.

2. The process according to claim 1 wherein the temperature range of the solution is from about 0° C. to about 30° C.

3. The process according to claim 1 wherein the temperature of the solution is about 5° C.

4. The process according to claim 1 wherein the sodium sulfate depleted solution including the entrained nickel and ammonia is recycled for further processing.

5. The process according to claim 1 wherein the solution is dewatered during the crystallization of the sodium sulfate.

6. A process for treating an effluent from the production of nickel hydroxide wherein the effluent includes nickel, ammonia, sodium sulfate, and water, the method comprising precipitating the sodium sulfate out of solution by crystallization by reducing the temperature of the effluent to equal to or below about 30° C. and simultaneously removing a quantity of water therewith to form a sodium sulfate depleted solution.

7. The process according to claim 6 including separating the sodium sulfate from the effluent.

8. The process according to claim 7 including recycling the solution back to the nickel hydroxide production process.

9. The process according to claim 6 wherein the temperature range of the solution is from about 0° C. to about 30° C.

10. The process according to claim 6 wherein the temperature of the solution is about 5° C.

* * * * *